(12) United States Patent
Motomura et al.

(10) Patent No.: US 6,539,176 B2
(45) Date of Patent: Mar. 25, 2003

(54) PHOTOMETRY DEVICE FOR CAMERA

(75) Inventors: Katsumi Motomura, Saitama (JP); Kiyoshi Ichikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/987,925

(22) Filed: Nov. 16, 2001

(65) Prior Publication Data

US 2002/0061191 A1 May 23, 2002

(30) Foreign Application Priority Data

Nov. 16, 2000 (JP) ........................................ 2000-349834

(51) Int. Cl.[7] .............................. G03B 7/08; G03B 15/05
(52) U.S. Cl. ....................... 396/170; 396/206; 396/257; 396/303
(58) Field of Search .............................. 396/165, 170, 396/257, 258, 255, 281, 287, 289, 206, 205, 213, 302, 303

(56) References Cited

U.S. PATENT DOCUMENTS 4,472,042 A * 9/1984 Iwata et al. .................. 396/165
4,500,191 A * 2/1985 Yamanaka .................... 396/165
6,363,222 B2 * 3/2002 Hata .......................... 396/257

OTHER PUBLICATIONS

U.S. application Ser. No. 09/699,465, Osamu, Noguchi et al.

* cited by examiner

*Primary Examiner*—W. B. Perkey
(74) *Attorney, Agent, or Firm*—Young & Thompson

(57) ABSTRACT

In a photometry device, a pair of transistors having the same properties. The first transistor is connected at its base to the CdS photo sensor, and at its collector to a resistor. The second transistor is connected at its base to the resistor, and at its collector to the photoconductive element. When a subject brightness is below a reference level that is defined by a resistance of the resistor, the CdS photo sensor has a smaller resistance than the resistance of the resistor, so a smaller current flows into a base of the first transistor than a current flowing into a base of the second transistor. Consequently, the first transistor is turned off, and the second transistor is turned on, conducting current through a solenoid. Thereby, a stop blade is switched over to change the stop size.

10 Claims, 12 Drawing Sheets

PHOTOMETRY DEVICE FOR CAMERA

BACKGROUND OF THE INVENTION

1. Field of the Invention

The present invention relates to a photometry device for a camera, especially for a compact camera or a lens-fitted photo film unit, that measures subject brightness with reliability at a low operation voltage.

2. Background Arts

As a kind of handy economy camera, lens-fitted photo film units have been widely known. As being preloaded with a roll of unexposed photo film, the lens-fitted photo film unit makes it possible for anyone to enjoy photography anytime anywhere. For the sake of simplifying the structure and thus cutting the manufacture cost, the exposure value is fixed in most kinds of film units. With such a fixed exposure value, however, the exposure amount can get lower or higher than the latitude of the preloaded photo film under some photographic conditions.

In order to control exposure value automatically according to the subject brightness, the film unit must be provided with a photometry device for the subject brightness. In many of conventional cameras with an automatic exposure control device, a CdS (cadmium sulfide) cell is mounted as a photoconductive element or a photo sensor on a front side as the photometry device. Since the CdS photo sensor changes its resistance with the amount of light received thereon, it is possible to detect the subject brightness as the resistance value.

As a power source for driving the photometry device with the CdS photo sensor, a battery with a terminal voltage of 3V or more has generally been used. Since the film unit usually uses a battery having a terminal voltage of 1.5 V for supplying its built-in flash device, it would be necessary to provide the film unit with a second battery for mounting the conventional photometry device in the film unit. The second battery would increase the size and manufacture cost of the film unit. Beside this problem, sensitivity characteristics of the CdS photo sensor can vary between individual products, and also depending upon temperature and power source voltage.

SUMMARY OF THE INVENTION

In view of the foregoing, an object of the present invention is to provide a photometry device for automatic exposure control of a camera, that operates stably even at a low power source voltage without being affected by environmental conditions.

According to the present invention, a photometry device provided in a camera, for detecting whether a subject brightness is less than or not less than a reference level, comprises a photoconductive element located to receive light from a subject, a first end of the photoconductive element being connected to a first electrode of a power source; a resistor whose first end is set at the same potential as the first end of the photoconductive element; a first transistor connected at its base to a second end of the photoconductive element, at its collector to a second end of the resistor and at its emitter to a second electrode of the power source; a second transistor connected at its base to the second end of the resistor, at its collector to the second end of the photoconductive element, and at its emitter to the second electrode of the power source; and a switching transistor which is turned on in response to a predetermined one of the first and second transistors being turned on, wherein the first and second transistors are turned on and off in contradiction to each other depending upon whether a current flowing through the photoconductive element is less than or not less than a current flowing through the resistor, so the switching condition of the switching transistor is used for detecting whether the subject brightness is less than or not less than the reference level.

The photometry device having the above configuration operates stably even when the power source voltage is low.

The first and second transistors are preferably the same type having the same properties, and a resistance between the base of the second transistor and the first end of the resistor is set equal to a resistance that is generated between the first end of the photoconductive element and the base of the first transistor when the subject brightness is equal to the reference level.

Thereby, the photometry is not affected by the temperature variations or other environmental conditions.

To use the photometry device as a member of an automatic exposure control device, the switching transistor may be connected to a stop changing device for changing stop size of the camera.

According to a preferred embodiment, current from the power source is supplied through a photometry switch to the photoconductive element and the resistor. The photometry switch is preferably turned on in response to a shutter release operation on the camera. Also a capacitor is connected in parallel to the power source and charged by the current from the power source while the photometry switch is on. After the photometry switch is turned off, the photoconductive element and the resistor are supplied with current discharged from the capacitor. Thereby, the first and second transistors keep their switching conditions for a time enough for the camera to complete an exposure in response to the shutter release operation.

Where the power source is used for supplying a flash circuit of the camera, the photometry device further comprises a device for stopping the flash circuit from charging in response to the photometry switch being turned on. Thereby, the power source voltage would not drop while the photometry device is activated, so the photometry device operates stably.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
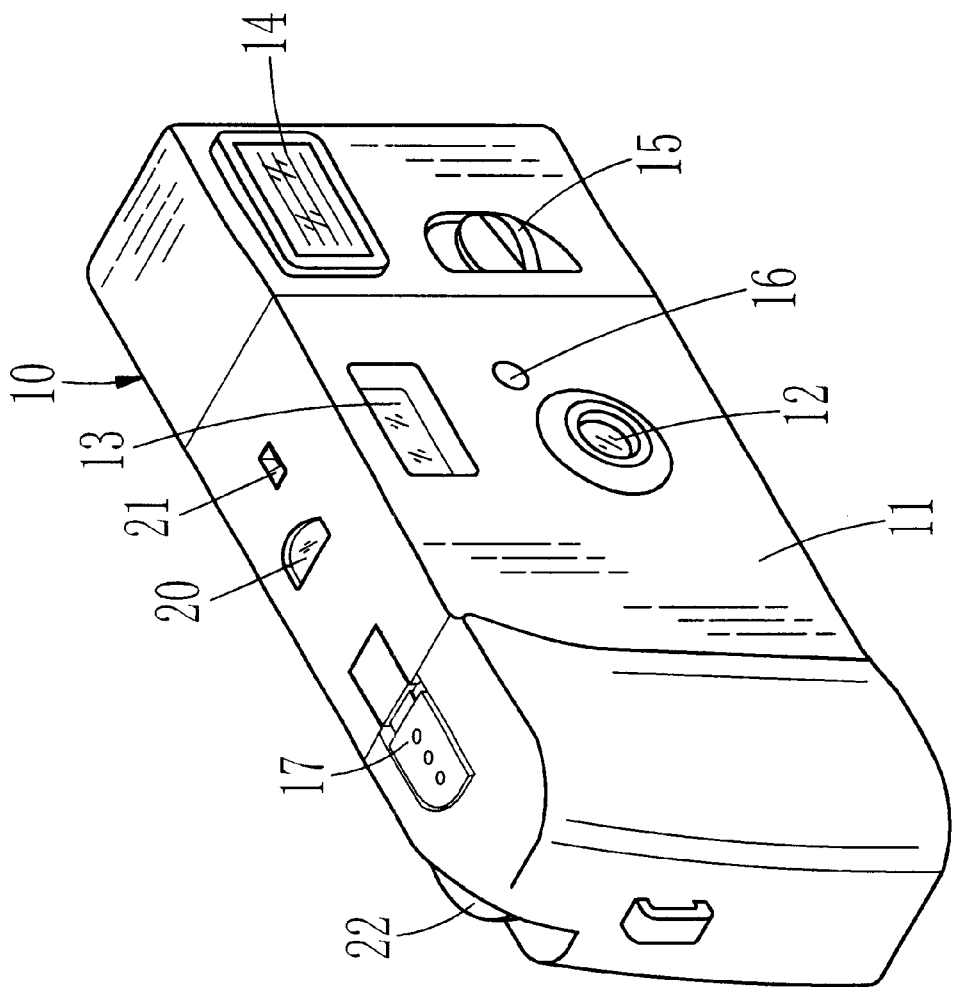
FIG. 1 shows a perspective view of a lens-fitted photo film unit provided with a photometry device according to an embodiment of the present invention.

A lens-fitted photo film unit of FIG. 1 embodying the present invention has a unit body 10 wrapped with a label 11. The unit body 10 has a taking lens 12, a view finder 13, a flash projector 14, a flash switch knob 15 and a CdS photo sensor 16 on its front. On top of the unit body 10 are provided a shutter button 17, a frame counter 20 and a flash charge indicator 21. A film winding wheel 22 is partly exposed from a rear side of the unit body 10.

Figure 2:
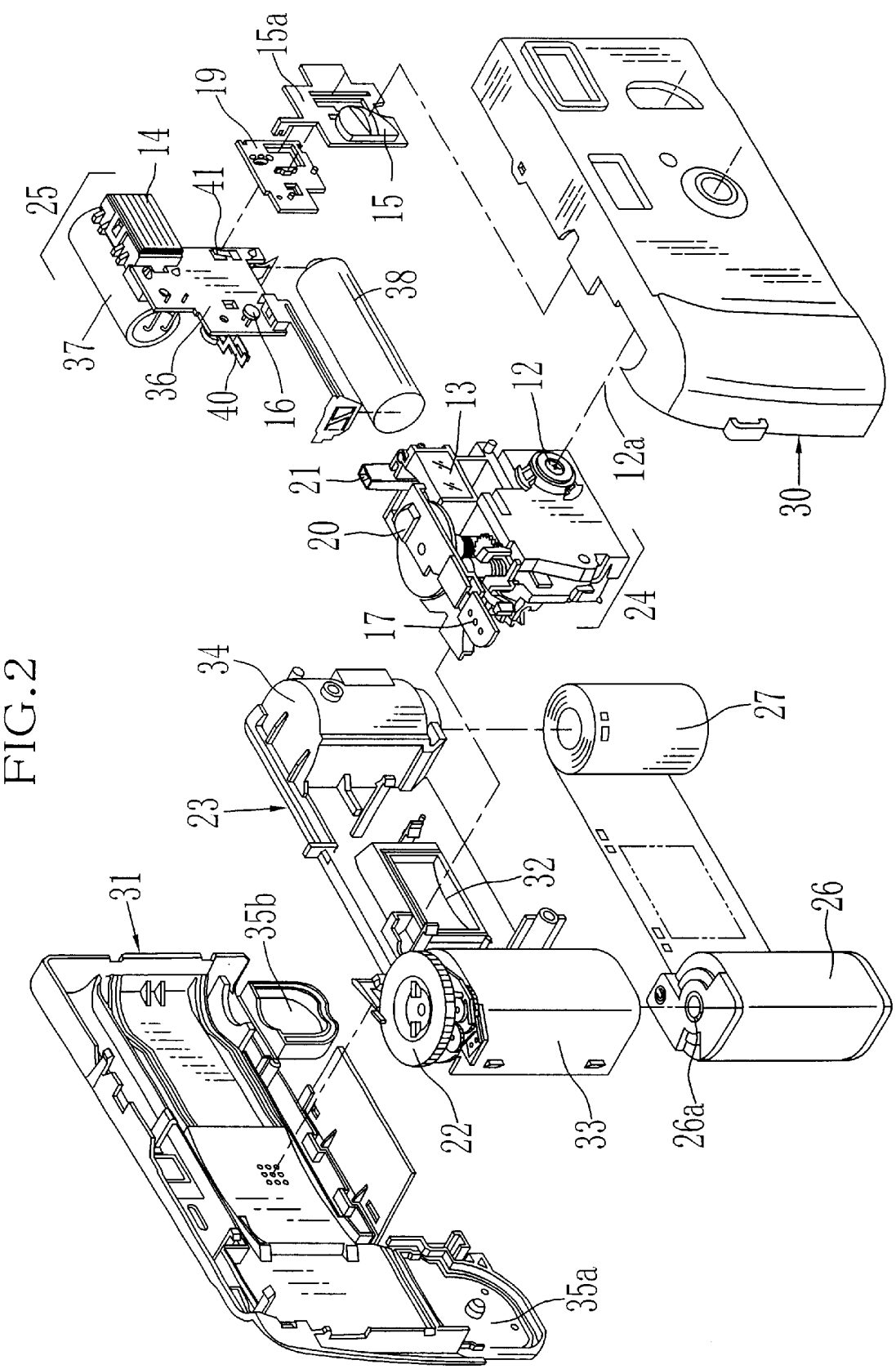
FIG. 2 shows an exploded perspective view of the film unit of FIG. 1.

As shown in FIG. 2, the unit body 10 is constituted of a body base 23, an exposure unit 24 having the taking lens 12 and the view finder 13, a flash unit 25 having the flash projector 14, a film cartridge 26, a photo filmstrip 27 pulled out from the film cartridge 26, and front and rear covers 31. The body base 23 is formed with an exposure opening 32 defining an exposure area of the photo filmstrip 27, a cartridge chamber 33 holding the film cartridge 26, and a film roll chamber 34 holding the photo filmstrip 27 in the form of a roll.

The film winding wheel 22 is mounted on the cartridge chamber 33, and is engaged with a spool 26a of the cartridge 26 through a not-shown bottom shaft. Since the photo filmstrip 27 is secured at its one end to the spool 26a, the photo filmstrip 27 is wound into the cartridge 26 by rotating the film winding wheel 22 in a counterclockwise direction in the drawings.

The exposure unit 24 is mounted in front of the exposure opening 23, and the flash unit 25 is mounted on one side of the exposure unit 24 to the body base 23. The front cover 30 is attached to the front of the body base 23, to cover the exposure unit 24 and the flash unit 25. Openings for exposing the taking lens 12, the view finder 13, the flash projector 14, the flash switch knob 15 and the CdS photo sensor 16 are formed through the front cover 30. The rear cover 31 is attached to the rear of the body base 23. Bottom lids 35a and 35b are formed integrally with the rear cover 31. The rear cover 31 and the bottom lids 35a and 35b close the rear and bottom sides of the cartridge chamber 33 and the film roll chamber 34 in a light tight fashion respectively.

The flash unit 25 is constituted of the flash projector 14, a main capacitor 37, a battery 38, a sync-flash switch 40, a push-type main switch 41 and other elements of a flash circuit, which are mounted on a printed circuit board 36. As the battery 38, an AA-type dry cell of 1.5V (R6) is used. The sync-flash switch 40 is turned on by a shutter blade 62 (see FIG. 4) when a shutter mechanism is released. The main switch 41 of the flash circuit is turned on or off by sliding the flash switch knob 15 up or down respectively. The flash switch knob 15 is clicked into a fastened condition at the upper ON position or at the lower OFF position, in cooperation with a supporting plate 19 as disposed behind the flash switch knob 15.

Figure 3:
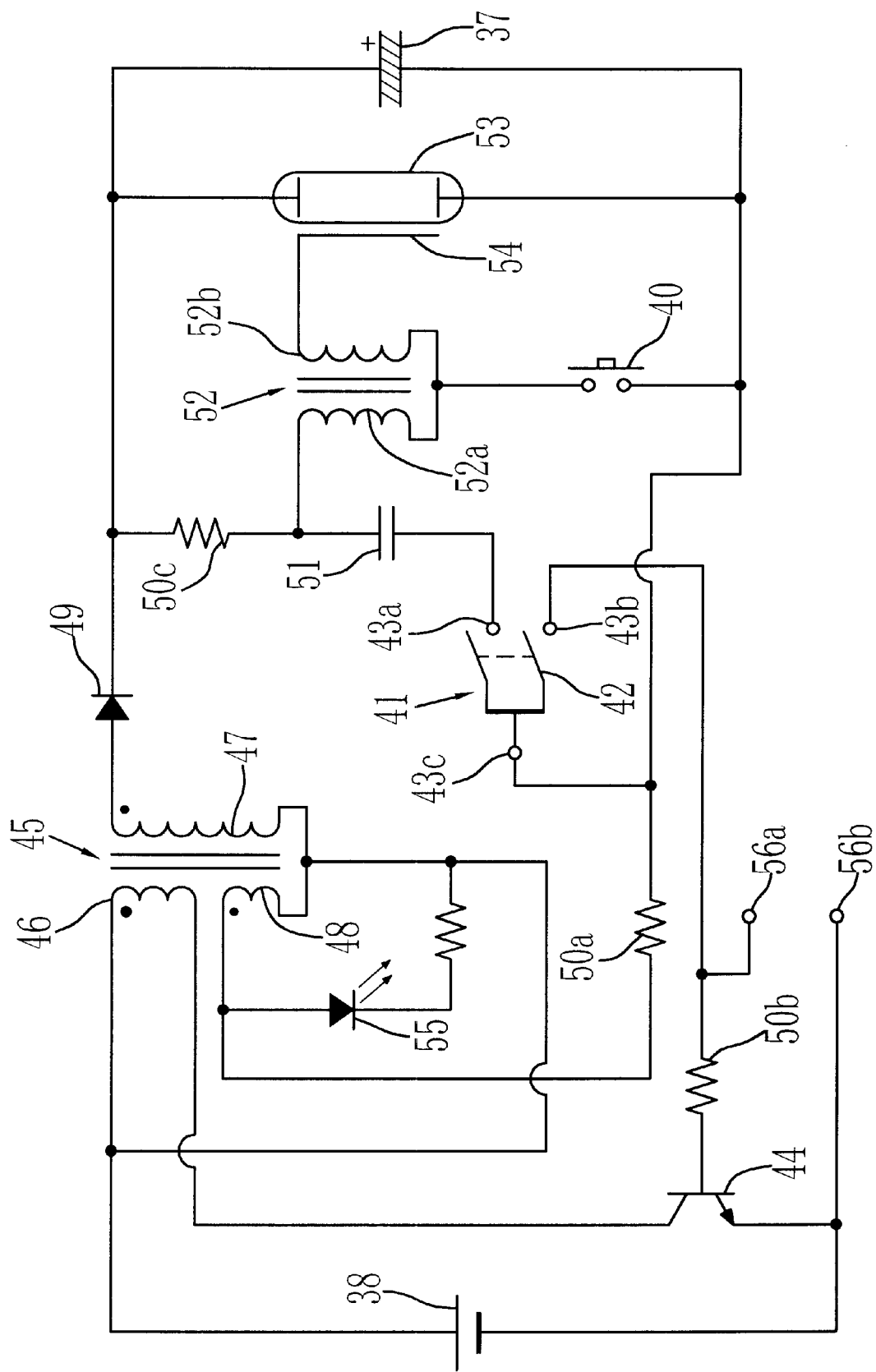
FIG. 3 shows a circuit diagram of a flash circuit of a flash unit of the film unit.

FIG. 3 shows the flash circuit of the flash unit. The main switch 41 consists of a movable strip 42 and first to third contacts 43a, 43b and 43c. One end of the movable strip 42 is securely connected to the third contact 43c. When the flash switch knob 15 is slid up to the ON position, the other end of the movable strip 42 is pushed into contact with the first and second contacts 43a and 43b, turning on the main switch 41.

An NPN-type oscillating transistor 44 and an oscillating transformer 45 constitute a well-known blocking oscillator circuit that transforms the power source voltage of the battery 38 to a higher voltage of about 300V. With the 300V voltage, the main capacitor 37 is charged. The oscillating transformer 45 consists of primary, secondary and tertiary coils 46, 47 and 48 which are inductively coupled to each other. The primary coil 46 is connected at one end to a plus electrode of the battery 38, and at the other end to a collector of the oscillation transistor 44. The secondary coil 47 is connected at one end to an anode of a rectifying diode 49, and at the other end to the plus electrode of the battery 38. One end of the tertiary coil 48 is also connected to the plus electrode of the battery 38, and the other end of the tertiary coil 48 is connected to the third contact 43c of the main switch 41 via a resistor 50a. An emitter of the oscillation transistor 44 is connected to a minus electrode of the battery 38, and a base of the oscillation transistor 44 is connected to the second contact 43b via a resistor 50b.

A cathode of the rectifying diode 49 is connected to a first electrode of a trigger capacitor 51 via a resistor 50c, and to a plus side electrode of the main capacitor 37. A second electrode of the trigger capacitor 51 is connected to the first contact 43a of the main switch 41. A minus side electrode of the main capacitor 37 is connected to the third contact 43c.

A trigger coil 52 consists of a primary trigger coil 52a and a secondary trigger coil 52b which are inductively coupled to each other. The primary trigger coil 52a is connected at one end to the first electrode of the trigger capacitor 51, and the second trigger coil 52b is connected at one end to a trigger electrode 54 that is located adjacent to a flash discharge tube 53 of the flash projector 14. The other ends of these trigger coils 52a and 52b constitute a common terminal, that is connected to the third contact 43c of the main switch 41 via the sync-flash switch 40. Opposite terminals of the flash discharge tube 53 are respectively connected to the opposite electrodes of the main capacitor 37.

In the flash circuit, a circuit section from the plus electrode of the battery 38 through the tertiary coil 48, the resistor 50a, the main switch 41, the resistor 50b, a base-emitter circuit of the oscillation transistor 44 to the minus electrode of the battery 38 constitutes a biasing circuit for activating the oscillation transistor 44. On the other hand, a circuit section from the secondary coil 47 through the rectifying diode 49, the main capacitor 37, the main switch 41, the resistor 50b, the base-emitter circuit of the oscillation transistor 44, the battery 38 to the secondary coil 47 constitutes a main charge circuit for conducting a secondary current that charges the main capacitor 37 and causes the oscillation transistor 44 to oscillate. A circuit section from the secondary coil 47 through the rectifying diode 49, the resistor 50c, the trigger capacitor 51, the main switch 41, the resistor 50b, the base-emitter circuit of the oscillation transistor 44, the battery 38 to the secondary coil 47 constitutes a subsidiary charge circuit for conducting the secondary current for charging the trigger capacitor 51. A circuit section from the trigger capacitor 51 through the primary trigger coil 52a, the sync-flash switch 40, the main switch 41 to the trigger capacitor 51 constitutes a trigger discharge circuit for conducting a discharged current from the trigger capacitor 51 to the primary trigger coil 52a.

When the main switch 41 is turned on, the biasing circuit is closed, so the oscillation transistor 44 is activated and the current from the battery 38, i.e. the collector current of the oscillation transistor 44, flows through the primary coil 46. Then an electro motive force is induced across the secondary coil 47 in accordance with the turn ratio of the secondary coil 47 to the primary coil 46, so the secondary current flows through the secondary coil 47 to the base of the oscillation transistor 44. With the increasing base current, the collector current of the oscillation transistor 44 increases. That is, the oscillation transistor 44 is caused to oscillate by the positive feedback effect of the oscillation transformer 45. Simultaneously, the secondary current flows through the main charge circuit and the subsidiary charge circuit, charging the main capacitor 37 and the trigger capacitor 51 respectively.

Designated by 55 is a light emitting diode that emits light when the main capacitor 37 is charged up to a predetermined voltage. The light from the light emitting diode 55 is projected to the outside of the film unit through a light guide, so the light guide and the light emitting diode 55 constitute the flash charge indicator 21.

When the sync-flash switch 40 is turned on, the trigger discharge circuit is closed, and the current is discharged from the trigger capacitor 51 through the primary trigger coil 52a. If the trigger capacitor 51 and thus the main capacitor 37 have been charged up to the predetermined voltage at that time, a high level trigger voltage is induced across the secondary trigger coil 52b, and is applied to the flash discharge tube 53 through the trigger electrode 54. Then, the main capacitor 37 is discharged through the flash discharge tube 53, causing the flash discharge tube 53 to radiate a flash light. So long as the main switch 41 is OFF, the trigger discharge circuit is not closed even if the sync-flash switch 40 is turned on, so the flash light emission process as above is not effected.

A photometry circuit 74 (see FIG. 4) that includes the CdS photo sensor 16 is also mounted on the printed circuit board 36, and is connected to the flash circuit at connecting points 56a and 56b, as described in detail later. The connecting point 56a is connected to the base of the oscillation transistor 44 via the resistor 50b, whereas the connecting point 56b is connected to the emitter of the oscillation transistor 44.

Figure 4:
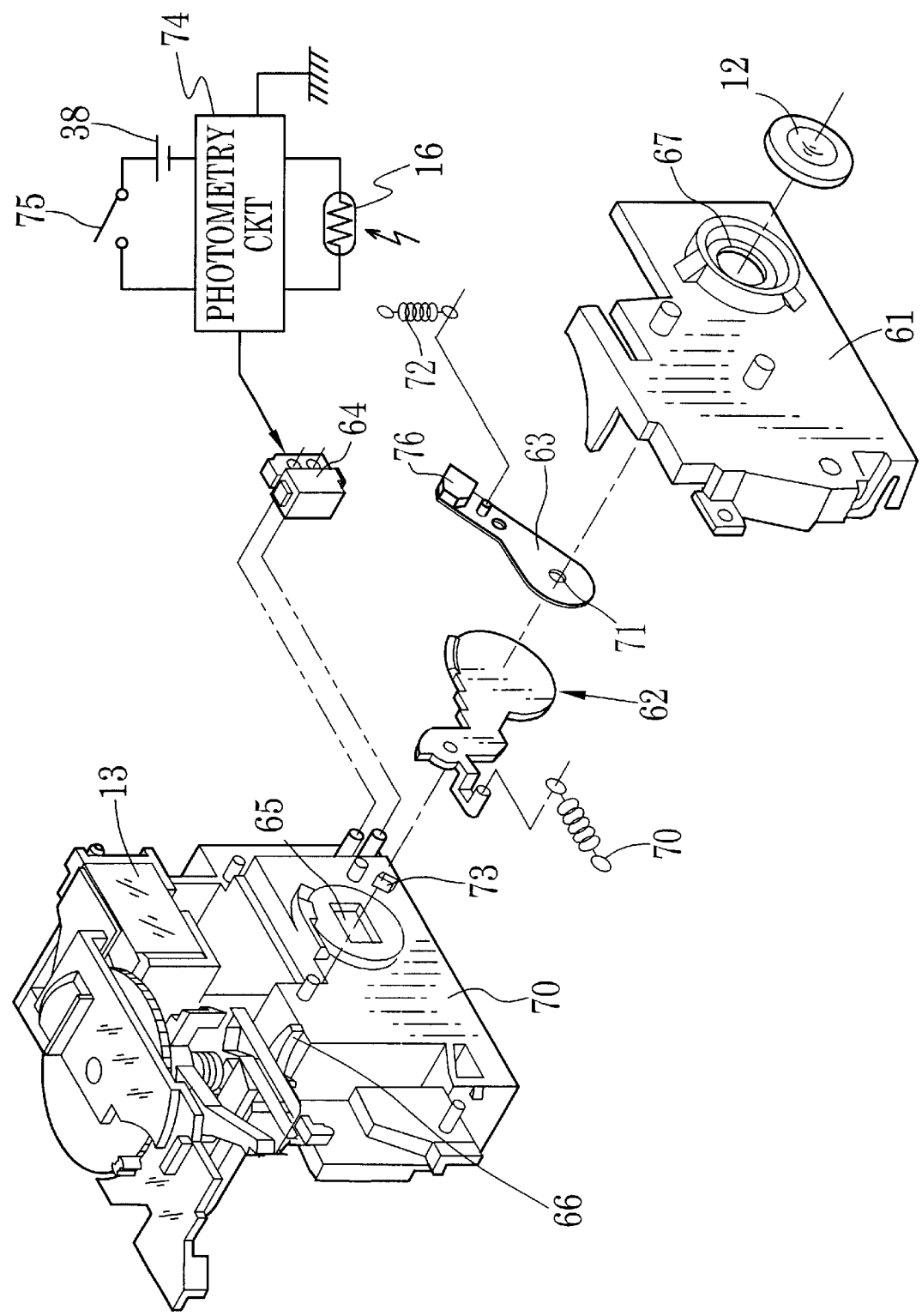
FIG. 4 shows an exploded perspective view illustrating an automatic exposure control mechanism including the photometry device.

As shown in FIG. 4, the exposure unit 24 includes a base frame 60, a shutter cover 61, and mechanisms necessary for photography. The view finder 13 and the shutter mechanism including a shutter drive lever 66 are mounted on the top side of the base frame 60. The shutter mechanism is configured such that the shutter lever 66 is moved to a charged position by winding up the photo filmstrip 27 one frame after each exposure. The shutter cover 61 is formed with a lens holder having a lens aperture 67, and the taking lens 12 is fitted in the lens holder in coaxial to the lens aperture 67. A shutter opening 65 is formed through a front wall of the base frame 60, for conducting the light from the taking lens 12 to the exposure opening 32. Thus, the base frame 60 doubles as a light-shielding box. The shutter blade 62, a stop blade 63 and a solenoid 64 are mounted to the front wall of the base frame 60.

The shutter blade 62 consists of a blade portion 62a and a pivot 62b at which the shutter blade 62 is mounted on the front wall of the base frame 60. The shutter blade 62 is urged by a spring 70 to move toward a closing position where the blade portion 62a closes the shutter opening 65, and is usually held in the closing position. When the shutter button 17 is pressed down, the shutter mechanism is activated, causing the shutter lever 66 to move from the charged position to a released position. On the way to the released position, the shutter lever 66 kicks an upper end of the pivot 62b, causing the shutter blade 62 to swing open the shutter opening 65 against the force of the spring 70. Thereafter, the shutter blade 62 returns to the closing position according to the force of the spring 70. While the shutter blade 62 opens the shutter opening 65, the photo filmstrip 27 is exposed to the light entering through the taking lens 12.

Figure 5A:
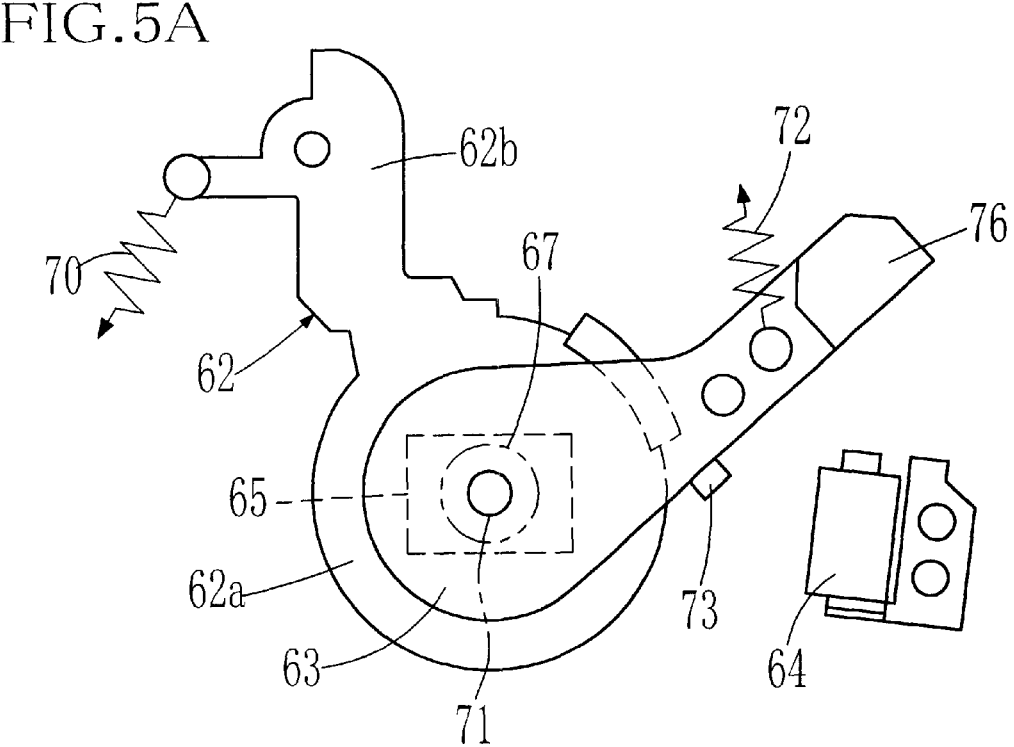
FIG. 5A shows an explanatory diagram illustrating essential parts of the automatic exposure control mechanism in a first position that is chosen when a subject brightness measured through the photometry device is above a reference level.
Figure 5B:
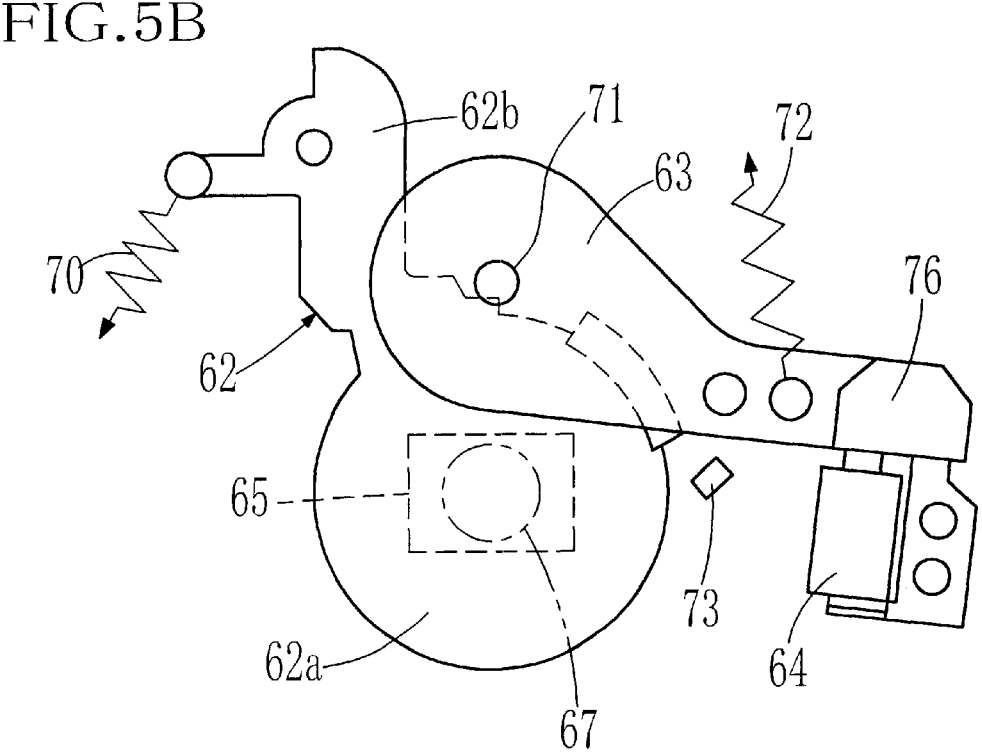
FIG. 5B shows an explanatory diagram illustrating the essential parts of the automatic exposure control mechanism in a second position that is chosen when the subject brightness is below the reference level.

The stop blade 63 is placed between the shutter cover 61 and the shutter blade 62, and is mounted pivotally on the front wall of the base frame 60. The stop blade 63 is formed with a stop aperture 71 of a smaller diameter than the lens aperture 67. As shown in FIG. 5A, the stop blade 63 is urged by a spring 72 to swing in a counterclockwise direction in the drawings, and is stopped in a first position by a stopper 73, where the stop aperture 71 is placed in coaxial to an optical axis 12a of the taking lens 12. Because of an iron chip 76 mounted on the opposite end of the stop blade 63 to the stop aperture 71, the stop blade 63 swings in a clockwise direction against the force of the spring 72 when the solenoid 64 is activated to generate a magnetic force to attract the iron chip 76, as shown in FIG. 5B. As a result, the stop blade 63 removes away from a light path of the taking lens 12, and stops at a second position where the iron chip 76 comes to contact with the solenoid 64. In the second position, the light path of the taking lens 12 is stopped by the lens aperture 67 in place of the stop aperture 71.

The solenoid 64 is securely mounted on the front wall of the base frame 60, and is connected to the photometry circuit 74. The photometry circuit 74 is activated when a photometry switch 75 is turned on to connect the battery 38 to the photometry circuit 74. The photometry circuit 74 applies a drive current to the solenoid 64 when a subject brightness measured through the CdS photo sensor 16 is not more than a predetermined threshold level.

Although it is omitted from the drawings, the shutter mechanism is provided with a delay device for putting a certain time lag from the time when the shutter button 17 is pressed to the time when the shutter lever 66 starts moving to the released position. The time lag is needed for the stop blade 63 to move from the first position to the second position, and is determined to be 5 ms to 10 ms. Thereby, the delay device prevents the shutter blade 62 from opening the shutter opening 65 so long as the stop blade 63 is in motion. The photometry switch 75 is provided in the delay device such that the photometry switch 75 is turned on simultaneously when the delay device is activated upon the shutter button 17 being pressed.

The photometry circuit 74 and the photometry switch 75 constitute a photometry device that is supplied from the battery 38, and the photometry device constitutes an automatic exposure control mechanism in combination with the stop blade 63, the solenoid 64 and the spring 72.

Figure 6:
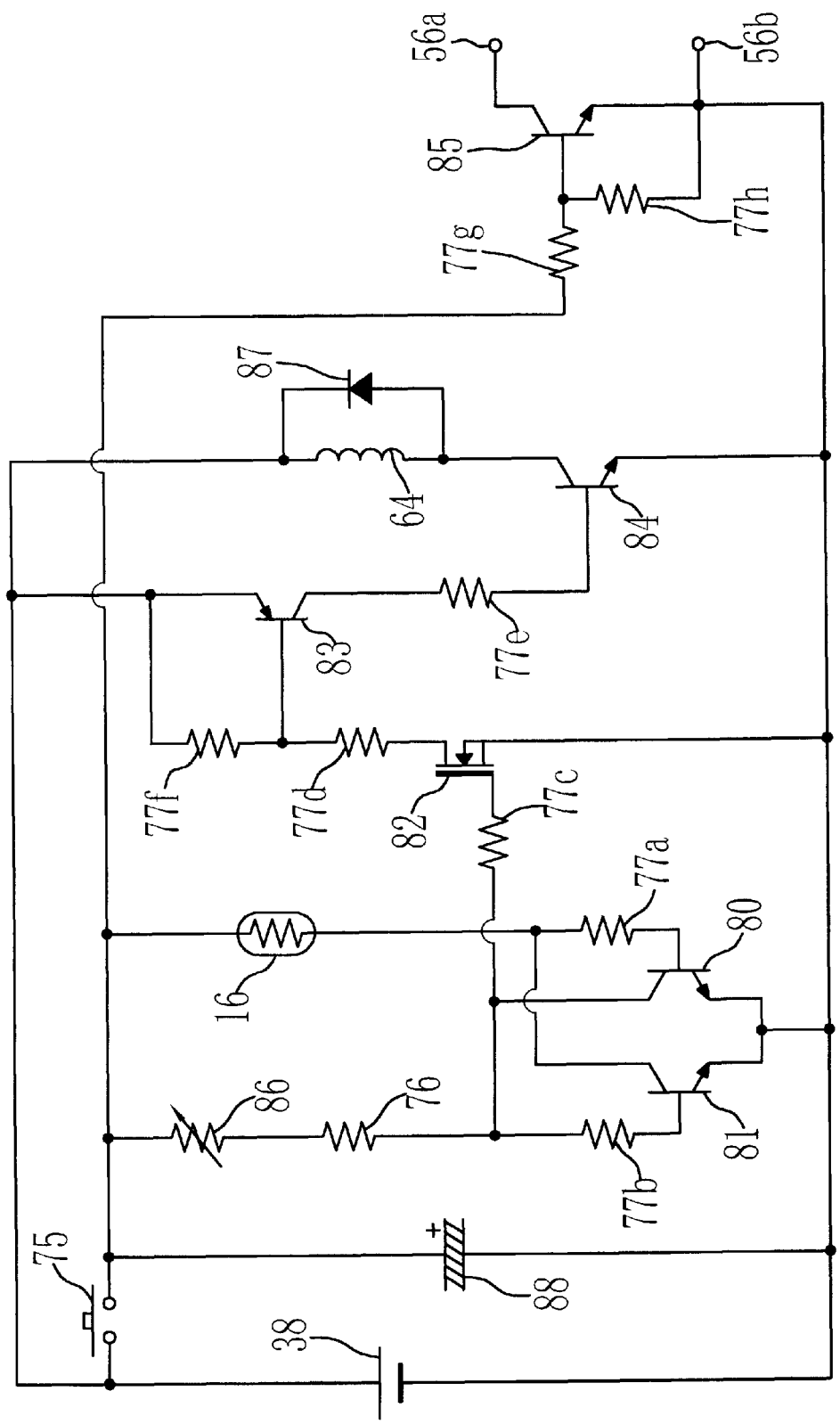
FIG. 6 shows a circuit diagram of the photometry device.

The circuitry of the photometry circuit 74 is shown in FIG. 6. As described above, the photometry circuit 74 and the flash circuit use the battery 38 as a common power source. The photometry circuit 74 consists of a photometry section, an aperture-size switching section, and a flash-charge stopping section. The photometry section includes the CdS photo sensor 16, a resistor 76 and transistors 80 and 81, the aperture-size switching section includes a primary transistor 82, a secondary transistor 83, a switching transistor 84 and the solenoid 64, and the flash-charge stopping section includes a stopping transistor 85 that is connected to the flash circuit at the connecting positions 56a and 56b.

One terminal of the CdS photo sensor 16 is connected to the photometry switch 75, and is connected to the plus electrode of the battery 38 through the photometry switch 75. The other terminal of the CdS photo sensor 16 is connected to a base of the transistor 80 via a resistor 77a. The resistor 76 is connected in series to a variable resistor 86, and is connected to the plus electrode of the battery 38 via the variable resistor 86 and the photometry switch 75. The resistor 76 is connected at the other end from the variable resistor 86 to a base of the transistor 81 via a resistor 77b.

The transistors 80 and 81 are of NPN-type and have the same properties. Emitters of these transistors 80 and 81 are connected to each other, and to the minus electrode of the battery 38. The base of the transistor 80 is connected to a collector of the transistor 81 via the resistor 77a. The base of the transistor 81 is connected to a collector of the transistor 80 via the resistor 77b. The resistors 77a and 77b have the same properties within ±5% errors.

The variable resistor 86 is provided for adjusting the photometry circuit 74 to a reference brightness which is predetermined as the threshold level for switching the aperture size. Specifically, during the manufacture of the film unit, a resistance of the CdS photo sensor 16 is measured as the CdS photo sensor 16 is illuminated with light of the reference brightness, and the resistance of the variable resistor 86 is adjusted to make a sum of the resistance of the resistor 76 and the resistance of the variable resistor 86 equal to the measured resistance of the CdS photo sensor 16.

When the photometry switch 75 is turned on, the current flows into the base of the transistor 80 via the CdS photo sensor 16 and the resistor 77a, and into the base of the transistor 81 via the variable resistor 86 and the resistors 76 and 77b. If the subject brightness is less than the reference brightness, the resistance of the CdS photo sensor 16 becomes larger than the sum of the resistances of the resistor 76 and the variable resistor 86. So the base current of the transistor 80 is less than the base current of the transistor 81, and a voltage across the emitter and collector of the transistor 80, i.e. a voltage across the base and emitter of the transistor 81, becomes higher than a voltage across the emitter and collector of the transistor 81, i.e. a voltage across the base and emitter of the transistor 80, the immediately after the photometry switch 75 is turned on. As a result, because of the feedback effect, the base current of the transistor 80 is getting smaller, while the base current of the transistor 81 is getting larger. In the end, the transistor 80 is turned off and the transistor 81 is turned on.

On the contrary, if the subject brightness is not less than the reference brightness, the resistance of the CdS photo sensor 16 becomes less than the sum of the resistances of the resistor 77b and the variable resistor 86, so the base current of the transistor 80 is larger than the base current of the transistor 81 immediately after the photometry switch 75 is turned on. As a result, because of the feedback effect, the base current of the transistor 80 gradually increases, while the base current of the transistor 81 gradually decreases. In the end, the transistor 81 is turned off and the transistor 80 is turned on.

Once either of the transistors 80 and 81 is turned on and the other is turned off, the switching conditions of the transistors 80 and 81 would not change unless the electric power supply to the photometry section is terminated, even if the resistance of the CdS photo sensor 16 changes afterward with a change in the subject brightness. Such a change in the subject brightness occurs when the flash light is projected in synchronism with the exposure.

A connecting point between the resistors 76 and 77b is connected to a gate of the primary transistor 82 that is a N-channel type MOSFET (MOS field effect transistor). The primary transistor 82 is connected at its source terminal to the emitter of the transistor 81, and the minus electrode of the battery 38. A drain of the primary transistor 82 is connected in series to the resistors 77d and 77f, and is connected to the plus electrode of the battery 38 via the resistors 77d and 77f. The secondary transistor 83 is of PNP-type, and is connected at its base to a connecting point between the resistors 77f and 77d, at its emitter to the battery 38, and at its collector to a base of the switching transistor 84 via a resistor 77e.

When the transistor 81 is turned on, a voltage is applied across the gate and source terminals of the primary transistor 82, the voltage being equal to a sum of the base-emitter voltage of the transistor 81 and a voltage dropping across the resistor 77b. Thereby, the primary transistor 82 gets conductive, so the current from the battery 38 flows through the resistors 77f and 77d. As a result, the base potential of the secondary transistor 83 decreases, turning on the secondary transistor 83.

The switching transistor 84 is of NPN-type, and is connected at its collector to one end of the solenoid 64 and an anode of a protection diode 87, and at its emitter to the minus electrode of the battery 38. The other end of the solenoid 64 and a cathode of the protection diode 87 are connected to the plus electrode of the battery 38. When the secondary transistor 83 is turned on, the current flows to the base of the switching transistor 84 via the resistor 77e, so the switching transistor 84 is turned on. Thereby, the current from the battery 38 flows through the solenoid 64, causing the stop blade 63 to move to the second position away from the optical path of the taking lens 12. That is, when the subject brightness is less than the reference level, the transistor 81 is turned on, and the switching transistor 84 is turned on to drive the solenoid 64.

The protection diode 64 is provided for protecting the switching transistor 84 from a back electromotive force that is generated across the solenoid 64 for a moment when the solenoid 64 is shut off, because the back electromotive force would damage the solenoid 64.

The stopping transistor 85 is of NPN-type, and connected at its base to the plus electrode of the battery 38 via a resistor 77g and the photometry switch 75. A collector of the stopping transistor 85 is connected to the connecting position 56a, i.e. to the base of the oscillation transistor 44 of the flash circuit, via a resistor 50b. An emitter of the stopping transistor 85 is connected to the minus electrode of the battery 38 and to the connecting position 56b, i.e. the emitter of the oscillation transistor 44. A resistor 77h is connected between the emitter and the base of the stopping transistor 85. The resistors 77h and 77g constitute a biasing circuit for the stopping transistor 85.

When the photometry switch 75 is turned on, the current flows through the resistors 77g and 77h, so a voltage across the resistor 77h is applied to the base-emitter circuit of the stopping transistor 85, making the stopping transistor 85 conductive. Even after the photometry switch 75 is turned off, the voltage across the resistor 77h is still applied to the base-emitter circuit of the stopping transistor 85 by virtue of a capacitor 88, as will be described later. Therefore, the stopping transistor 85 is maintained conductive till the charge stored in the capacitor 88 is fully discharged.

Since the collector of the stopping transistor 85 is connected to the base of the oscillation transistor 44 via the connecting point 56a and the resistor 50b, and the emitter of the stopping transistor 85 is connected to the emitter of the oscillation transistor 44 through the connecting point 56b, when the stopping transistor 85 gets conductive, the base of the oscillation transistor 44 is connected to the emitter of the oscillation transistor 44 through the resistor 50b and the stopping transistor 85, so the oscillation transistor 44 is turned off. Accordingly, while the photometry circuit 74 is active, charging operation of the flash circuit is stopped, so a voltage drop in the power source voltage from the battery 38 is prevented. Even while the charging operation is stopped, it is possible to project the flash light.

As described so far, the judgement as to whether the subject brightness is above or below the reference brightness is made by comparing the base current of the transistor 80 to the base current of the transistor 81. Such a circuit needs a low drive voltage, so the battery 38 with the low terminal voltage is usable for activating the photometry circuit 74. Furthermore, the photometry circuit 74 is not affected by a voltage drop in the power source voltage. Since the transistors 80 and 81 and the resistors 77a and 77b respectively have the same properties, temperature has the same influence on the base currents of the transistors 80 and 81, so the switching operation is stable against the change in the atmospheric temperature.

The capacitor 88 is connected at one end to the plus electrode of the battery 38 via the photometry switch 75, and at the other end to the minus electrode of the battery 38. The capacitor 88 constitutes a charge storage circuit in combination with the photometry switch 75 and the battery 38, and is charged by the current from the battery 38 while the photometry switch 75 is on. After the photometry switch 75 is turned off, the current discharged from the capacitor 88 is supplied to the photometry section and the flash-charge stopping section. Thus, the photometry circuit 74 may continue working for a time, e.g. 1000 ms or so, even after the photometry switch 75 is turned off. According to this configuration, even if the photometry switch 75 is turned on again immediately after it is turned off, because of chattering or other erroneous operation, the transistors 80 and 81 keep their switching conditions that are determined by the level of the subject brightness.

Although the photometry switch 75 is maintained on for a very short time, i.e. several micro seconds, the current from the capacitor 88 maintains the photometry circuit 74 active for a longer time enough for changing the aperture size and holding the stop blade 63 in the second position till the exposure is accomplished, and also for stopping charging the flash circuit so long as the photometry circuit 74 is active. The capacitance of the capacitor 88 is determined, taking consideration of a time constant of the charge storage circuit and a charge amount enough for accomplishing the photometry. That is, the capacitor 88 is designed to be fully discharged first after the shutter blade 62 completes opening and closing the shutter opening 65.

As described above, the solenoid 64 is directly supplied from the battery 38, so the charge stored in the capacitor 88 is prevented from being consumed in a short time by the solenoid 64 as having a very small resistance while the switching transistor 84 is conductive. Thus, the capacitance of the capacitor 88 may be minimized. Even though the solenoid 64 is designed to be supplied directly from the battery 38, the current would not flow through the solenoid 64 unless the primary transistor 82 and thus the switching transistor 84 get conductive. Therefore, useless consumption of the battery 38 is prevented.

Figure 7:
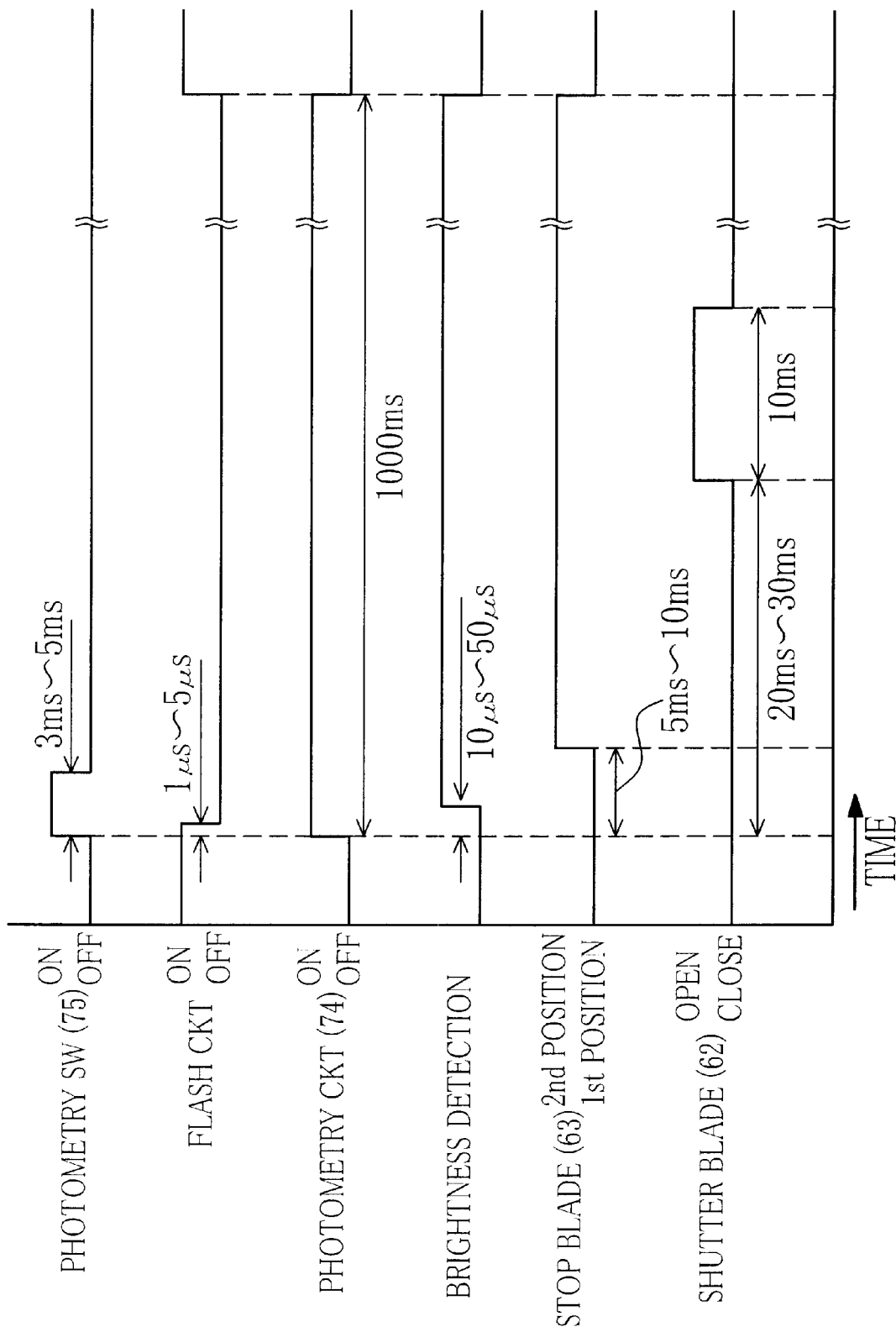
FIG. 7 shows timing charts illustrating the operation of the exposure control mechanism.

Now the operation of the automatic exposure control mechanism will be described with reference to the timing charts shown in FIG. 7 that show an example where the subject brightness is less than the reference brightness, and the flash circuit is activated. However, the automatic exposure control mechanism operates in the same way while the flash circuit is not active.

When the shutter button 17 is pressed down, the photometry switch 75 is turned on. While the photometry switch 75 is on, i.e. 3 ms to 5 ms in this instance, the capacitor 88 is charged, and also the stopping transistor 85 gets conductive, so the charging of the flash circuit is stopped, and the current flows into the bases of the transistors 80 and 81.

If the subject brightness is less than the reference brightness, the resistance of the CdS photo sensor 16 becomes more than the sum of the resistance values of the resistance 76 and the variable resistor 86, so the base current of the transistor 80 becomes less than the base current of the transistor 81 immediately after the photometry switch 75 being turned on. Because of the feedback effect of the respective transistors 80 and 81, the transistor 80 is turned off, and the transistor 81 is turned on. To reach this switching condition, it takes 10 to 50 μs for the transistors 80 and 81 from the time when the photometry switch 75 is turned on.

Even after the photometry switch 75 is turned off, the photometry circuit 74 is maintained active by the current discharged from the capacitor 88, so the transistor 80 is kept off, whereas the transistor 81 is kept on. Also the stopping transistor 85 is kept on, stopping the flash circuit from charging.

As the transistor 81 is turned on, a potential difference is generated across the gate and source of the primary transistor 82, so the primary transistor 82 is turned on. With the primary transistor 82 being turned on, the secondary transistor 83 and the switching transistor 84 are seriatim turned on, and thus the current flows through the solenoid 64. Then, the solenoid 64 attracts the stop blade 63 to move to the second position.

On the other hand, the shutter drive lever 66 is held in the charged position by the delay device for the predetermined delay time, i.e. 5 ms to 10 ms in this instance, after the shutter button 17 is pressed. When the delay time is over, the shutter drive lever 66 is released to kick the shutter blade 62. As a result, the shutter blade 62 begins to open the shutter opening 65 in 20 ms to 30 ms after the photometry switch 75 is turned on.

While the shutter blade 62 is opening and then closing the shutter opening 65, the stop blade 63 is held in the second position because the photometry circuit 74 is maintained active by the current from the capacitor 88. After the open-close operation of the shutter blade 62, the capacitor 88 is fully discharged, so the photometry circuit 74 and thus the solenoid 64 are deactivated. Then, the stop blade 63 returns to the first position according to the force of the spring 72, and the stopping transistor 85 is turned off, letting the flash circuit restart charging.

On the contrary, if the subject brightness is not less than the reference brightness, the resistance of the CdS photo sensor 16 becomes less than the sum of the resistance values of the resistance 76 and the variable resistor 86, so the base current of the transistor 80 becomes more than the base current of the transistor 81 immediately after the photometry switch 75 being turned on. Because of the feedback effect of the respective transistors 80 and 81, the transistor 80 is turned on, and the transistor 81 is turned off. In this switching condition, merely the emitter-collector voltage of the transistor 80 is applied across the gate and source of the primary transistor 82 via the resistor 77c, so the primary transistor 82 stays off.

Accordingly, the current does not flow the secondary transistor 83 and the switching transistor 84, so the solenoid 64 is not activated, and the stop blade 63 stays in the first position. Also in this case, the transistor 80 is kept on and the transistor 81 is kept off, whereas the stopping transistor 85 is kept on to stop charging the flash circuit, from the time when the photometry switch 75 is turned on to the time when the capacitor 88 is fully discharged.

The film unit configured as above operates as follows.

As the film winding wheel 22 is turned to place an unexposed frame of the photo filmstrip 27 behind the exposure opening 32, the shutter drive lever 66 is moved to the charged position. When the photo filmstrip 27 is wound up by one frame, the shutter drive lever 66 is arrested in the charged position, and the film winding wheel 22 is locked by a not-shown winding lock mechanism. In this condition, the photometry switch 75 is off, and the photometry circuit 74 is inactive, so the photometry circuit 74 does not consume the battery 38 uselessly.

Thereafter when the shutter button 17 is pressed, the delay device is activated, and the photometry switch 75 is turned on to activate the photometry circuit 74. When the subject brightness is less than the reference brightness, the solenoid 64 is driven to attract and hold the stop blade 63 to the second position, as shown in FIG. 5B. When the subject brightness is not less than the reference brightness, the solenoid 64 is not driven, so the stop blade 63 is held in the first position according to the force of the spring 72, as shown in FIG. 5A.

After the lapse of the predetermined delay time, the delay device releases the shutter drive lever 66 from the charged position, so the shutter drive lever 66 moves to the released position, while kicking the shutter blade 62. Thus, the shutter opening 65 is opened to expose the photo filmstrip 27.

Where the subject brightness is very high, e.g. outdoor on a sunny day, the stop blade 63 is kept in the first position, so the exposure is made through the stop aperture 71 of the smaller diameter. Thus, the exposure amount is stopped to a proper range by the stop aperture 71, preventing the over-exposure. On the other hand, where the subject brightness is insufficient, the exposure is made while the stop blade 63 is held in the second position, i.e. just through the lens aperture 67 of a larger diameter than the stop aperture 71. Thereby the exposure amount is raised, so the picture is photographed at a proper exposure, preventing the under-exposure.

Under a very dark condition, e.g. at night, the photographer slides the flash switch knob 15 up to the ON position. Then, the flash circuit is activated to charge the main capacitor 37. After the flash charge indicator 21 starts lighting to indicate the completion of charging, the photographer presses the shutter button 17 to make a flash photography. In this condition, the subject brightness is less than the reference brightness at the moment when the shutter button 17 is pressed, so the solenoid 64 is driven to move the stop blade 63 to the second position. Thus, the photo filmstrip 27 is exposed through the lens aperture 67, without the stop aperture 71.

Figure 8:
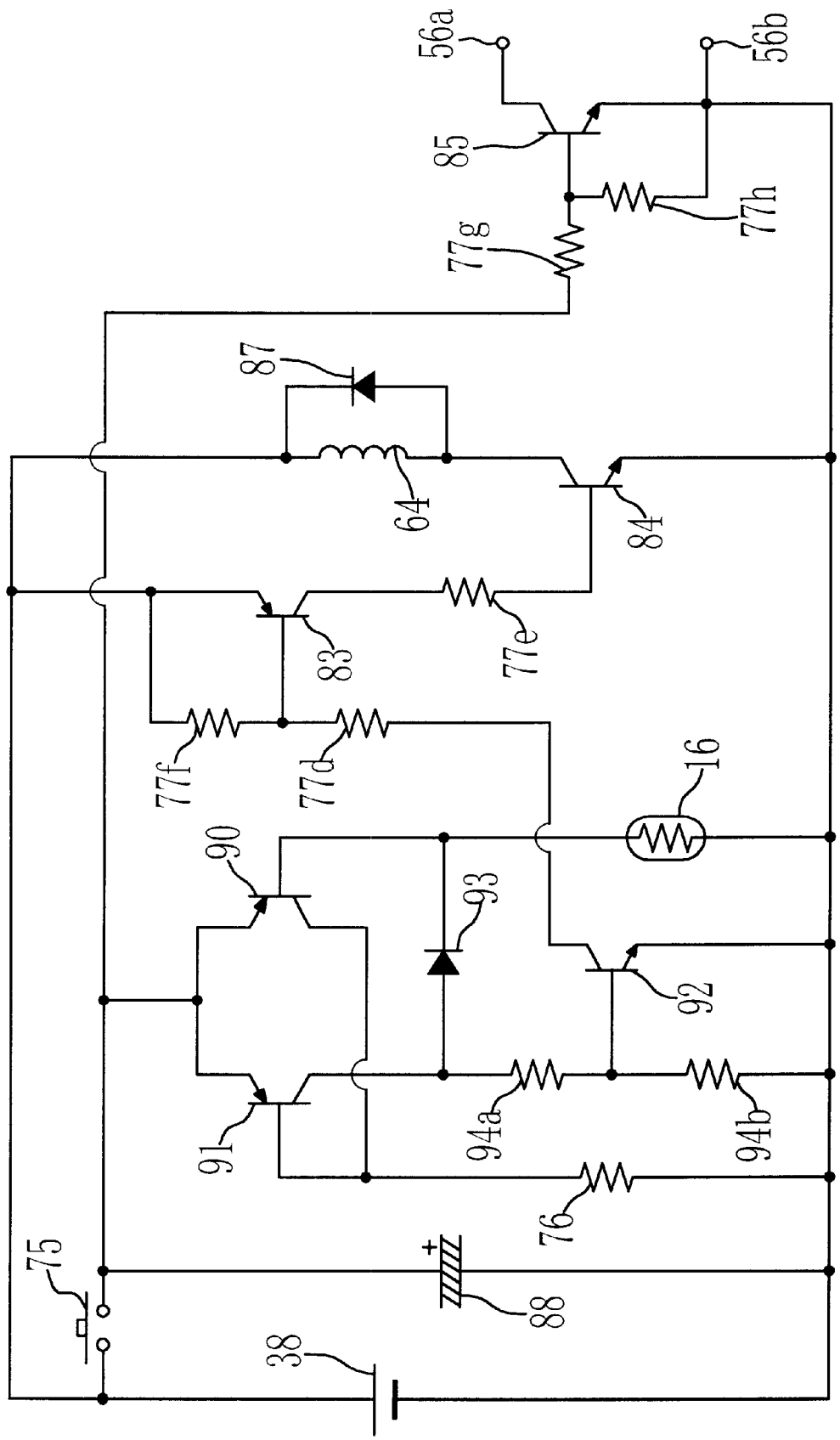
FIG. 8 shows a circuit diagram of a second embodiment of the photometry device.

FIG. 8 shows a photometry circuit according to a second embodiment of the present invention, wherein like or equivalent elements are designated by the same reference numerals as the first embodiment, so the details of these elements are omitted from the following description.

In the second embodiment, emitters of PNP-type transistors 90 and 91 are connected to a plus electrode of the battery 38 via the photometry switch 75. The transistor 90 is connected at its base to a minus electrode of the battery 38 via the CdS photo sensor 16, and at its collector to a base of the transistor 91. The transistor 91 is connected at its collector to the minus electrode of the battery 38 via resistors 94a and 94b which are connected in series to each other. The base of the transistor 91 is also connected to the minus electrode of the battery 38 via a resistor 76. A connecting point between the resistors 94a and 94b is connected to a base of a primary transistor 92 of NPN-type.

The collector of the transistor 91 is connected also to the base of the transistor 90 via a diode 93 whose anode is oriented to the collector of the transistor 91. The primary transistor 92 is connected at its collector to a base of a secondary transistor 83 via a resistor 77d, and at its emitter to the minus electrode of the battery 38.

When the subject brightness is smaller than a reference level, the CdS photo sensor 16 has such a large resistance that the current flowing into the base of the transistor 90 is less than the current flowing into the base of the other transistor 91 immediately after the photometry switch 75 is turned on. As a result, the voltage across the emitter-collector of the transistor 90, i.e. the base-emitter voltage of the transistor 91, increases, so the base current of the transistor 91 increases. Simultaneously, the emitter-collector voltage of the transistor 91, i.e. the base-emitter voltage of the transistor 90, decreases, so the base current of the transistor 90 decreases. Consequently, the transistor 91 is turned on, and the transistor 90 is turned off.

When the transistor 91 is turned on, the current flows from the collector of the transistor 91 through the resistors 94a and 94b, so the base voltage of the primary transistor 92 increases, and thus the primary transistor 92 is turned on. Then, the secondary transistor 83 and a switching transistor 84 are turned on, conducting the current through the solenoid 64. In this way, when the subject brightness is smaller than the reference level, the exposure is made through the lens aperture 67 without using the stop aperture 71.

On the contrary, when the subject brightness is not less than the reference level, the CdS photo sensor 16 has such a small resistance that the transistor 90 is turned on and the transistor 91 is turned off in the opposite way to the above case. Because the current does not flow through the primary transistor 92 and the following circuit in this case, the solenoid 64 is not activated, and the exposure is made through the stop aperture 71.

In the second embodiment, if the base current of the transistor 90 should flow into the base of the primary transistor 92 via the resistor 94a, the solenoid 64 would be activated even while the subject brightness is sufficiently high. To prevent such a malfunction, the base of the transistor 90 is connected through the diode 93 to the collector of the transistor 91. Besides, since a forward voltage of the diode 93 is applied across the emitter-base circuit of the transistor 90 while the transistor 91 is on, and which might turn on the transistor 90, it is desirable to use a Schottky diode having a forward voltage of about 0.3V as the diode 93.

Figure 9:
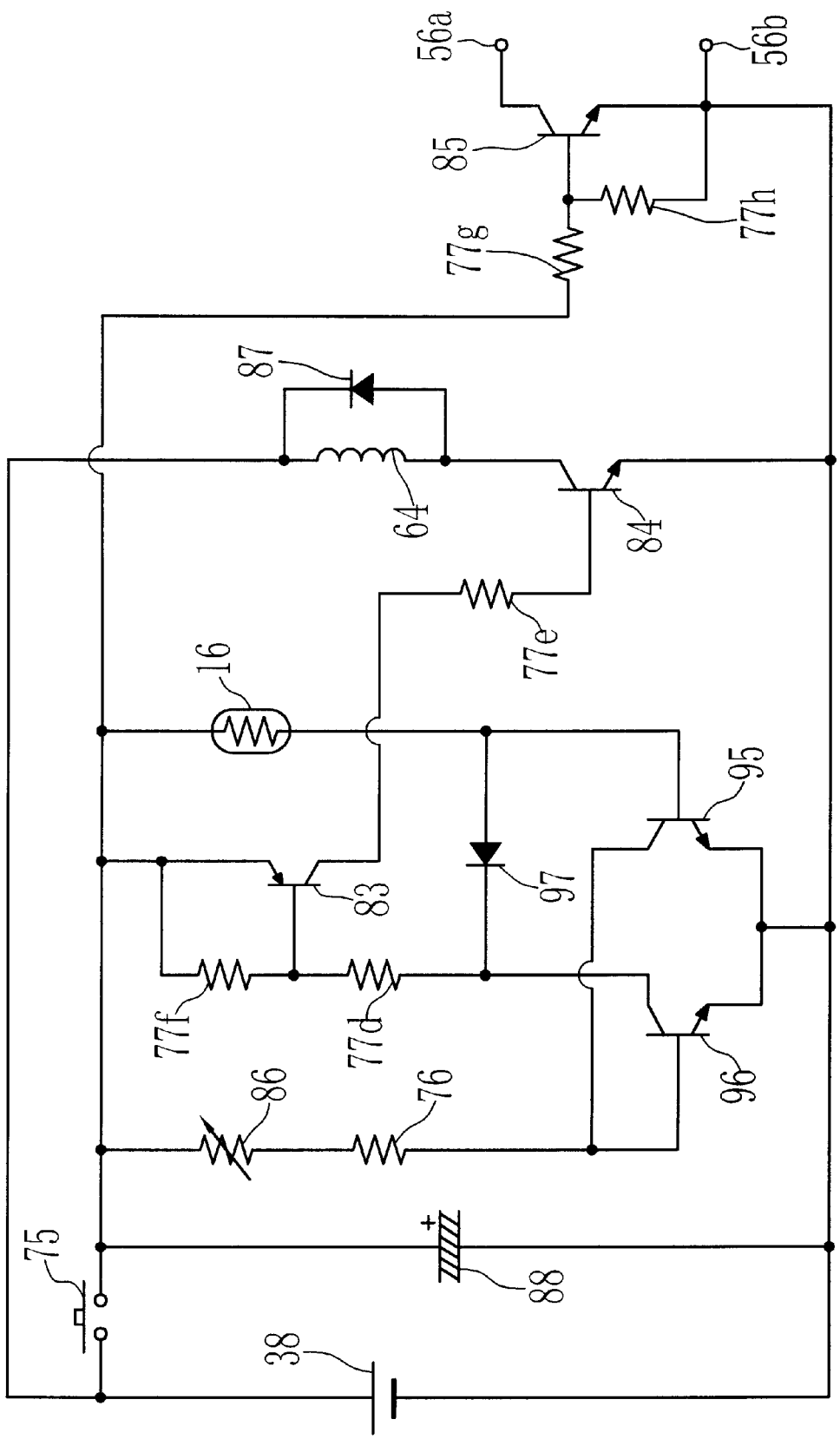
FIG. 9 shows a circuit diagram of a third embodiment of the photometry device.

FIG. 9 shows a photometry circuit according to a third embodiment of the present invention, wherein like or equivalent elements are designated by the same reference numerals as the above embodiments, so the details of these elements are omitted from the following description.

In the third embodiment, emitters of NPN-type transistors 95 and 96 are connected together to the minus electrode of the battery 38. The transistor 95 is connected at its base to the plus electrode of the battery 38 via the CdS photo sensor 16 and the photometry switch 75, and at its collector to a base of the other transistor 96. The base of the transistor 96 is connected to the plus electrode of the battery 38 via a resistor 76, a variable resistor 86 and the photometry switch 75. A collector of the transistor 96 is connected to the base of the transistor 95 via a diode 97 whose anode is oriented to the base of the transistor 95. The collector of the transistor 96 is also connected to the photometry switch 75 via resistors 77d and 77f which are connected in series to each other. A connecting point between the resistors 77f and 77d is connected to a base of a secondary transistor 83. The secondary transistor 83 is connected at its emitter to the battery 38 via the photometry switch 75, and at its collector to a base of a switching transistor 84 via a resistor 77e.

Accordingly, a primary transistor is omitted from the photometry circuit of the third embodiment, and the secondary transistor 83 is driven directly by the current flowing through the transistor 96. After the photometry switch 75 is turned off, the current is supplied from a capacitor 88 to the base of the secondary transistor 83, and thus to the base of the switching transistor 84.

When the subject brightness is smaller than a reference level, the CdS photo sensor 16 has such a large resistance that the current flowing into the base of the transistor 95 is less than the current flowing into the base of the other transistor 96 immediately after the photometry switch 75 is turned on. As a result, the voltage across the emitter-collector of the transistor 95, i.e. the base-emitter voltage of the transistor 96, increases, so the base current of the transistor 96 increases. As a result, the emitter-collector voltage of the transistor 96, i.e. the base-emitter voltage of the transistor 95, decreases, so the base current of the transistor 95 decreases. Consequently, the transistor 96 is turned on, and the transistor 95 is turned off.

When the transistor 96 is turned on, the base voltage of the secondary transistor 83 decreases, turning on the secondary transistor 83. Then, the switching transistor 84 is turned on, conducting the current through the solenoid 64. In this way, when the subject brightness is smaller than the reference level, the exposure is made through the lens aperture 67 without using the stop aperture 71.

On the contrary, when the subject brightness is not less than the reference level, the CdS photo sensor 16 has such a small resistance that the base current of the transistor 95 becomes more than the base current of the transistor 96 immediately after the photometry switch 75 is turned on. As a result, the transistor 95 is turned on, and the transistor 96 is turned off in the opposite way to the above case. Because the current does not flow through the secondary transistor 83 and the following circuit in this case, the solenoid 64 is not activated, and the exposure is made through the stop aperture 71.

The diode 97 is provided for preventing the collector current of the transistor 96 from partly flowing into the base of the transistor 95. It is desirable to use a Schottky diode as the diode 97, for a similar reason as described with respect to the second embodiment.

Figure 10:
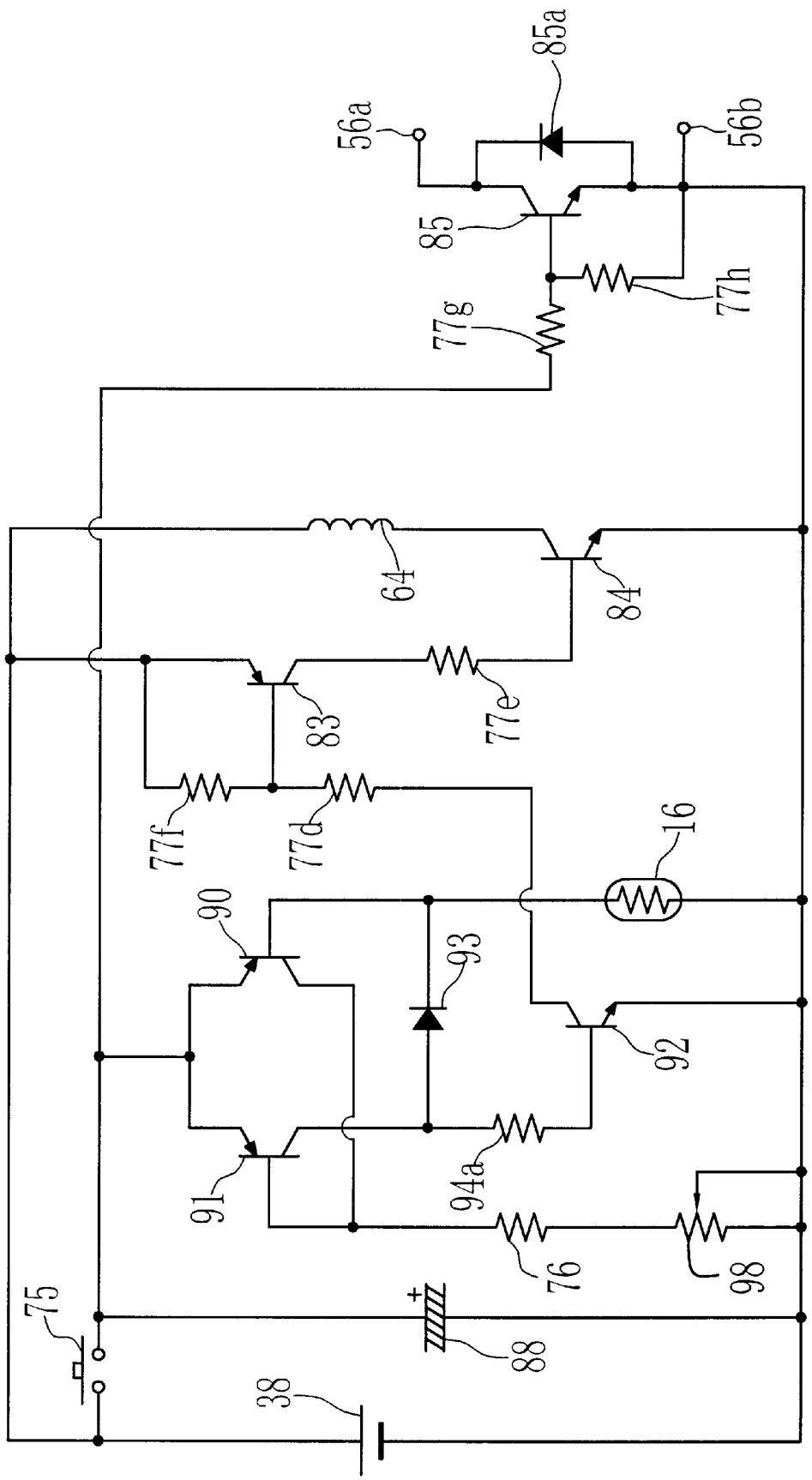
FIG. 10 shows a circuit diagram of a fourth embodiment of the photometry device.

FIG. 10 shows a photometry circuit according to a fourth embodiment of the present invention. The fourth embodiment is similar to the second embodiment, so the following description will relate only to those elements essential for the fourth embodiment, and like or equivalent elements are designated by the same reference numerals as the second embodiment.

In the fourth embodiment, a transistor 91 is connected at its base to the minus electrode of the battery 38 via a resistor 76 and a variable resistor 99. The variable resistor 99 functions the same way as the variable resistor 86. That is, the resistance of the variable resistor 99 is changed to adjust the reference brightness.

The transistor 91 is connected at its collector to a base of the primary transistor 92 via a resistor 94a, so the primary transistor 92 is turned on when the current flows from the collector of the transistor 91 through the resistor 94a into the base of the primary transistor 92.

A protection diode 85a is connected between an emitter and a collector of a stopping transistor 85, with an anode of the protection diode 85a oriented to the emitter of the stopping transistor 85. The protection diode 85a is provided for protecting the stopping transistor 85 from being damaged by a voltage that is generated through a contact resistance of the main switch 41 when the trigger capacitor 51 is discharged in response to the sync-flash switch 40 being turned on. Unlike the other embodiment, the protection diode 87 is not connected in parallel to the solenoid 64. Instead, a transistor with a high durability against the voltage is used as the switching transistor 84 in the fourth embodiment, for protecting the switching transistor 84 from being damaged by the counter electromotive force as generated across the solenoid 64.

Figure 11:
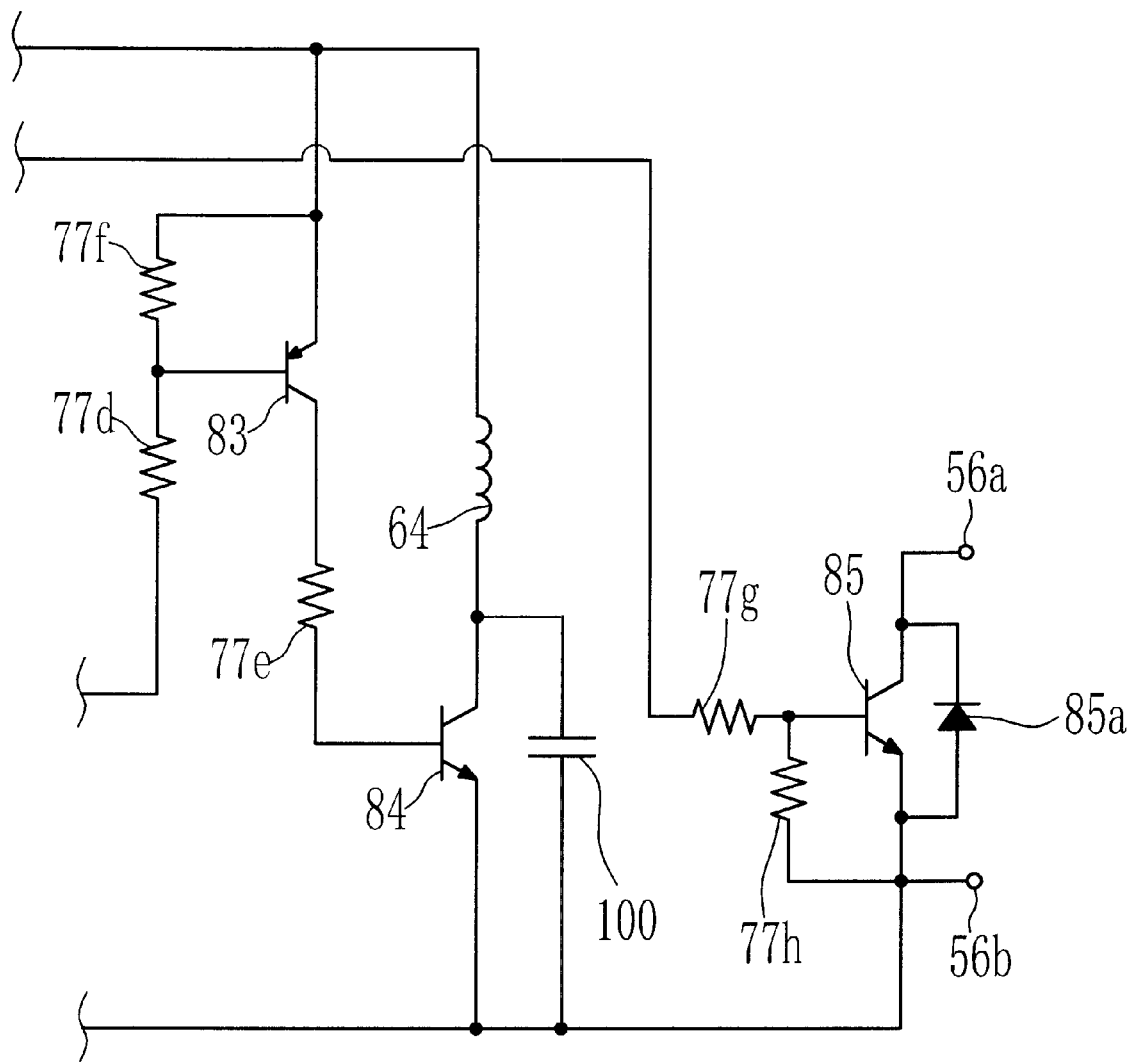
FIG. 11 shows a fragmentary circuit diagram of a fifth embodiment of the photometry device, wherein a capacitor is connected between a collector and an emitter of a switching transistor, for protecting the switching transistor from a counter electromotive force generated across a solenoid.
Figure 12:
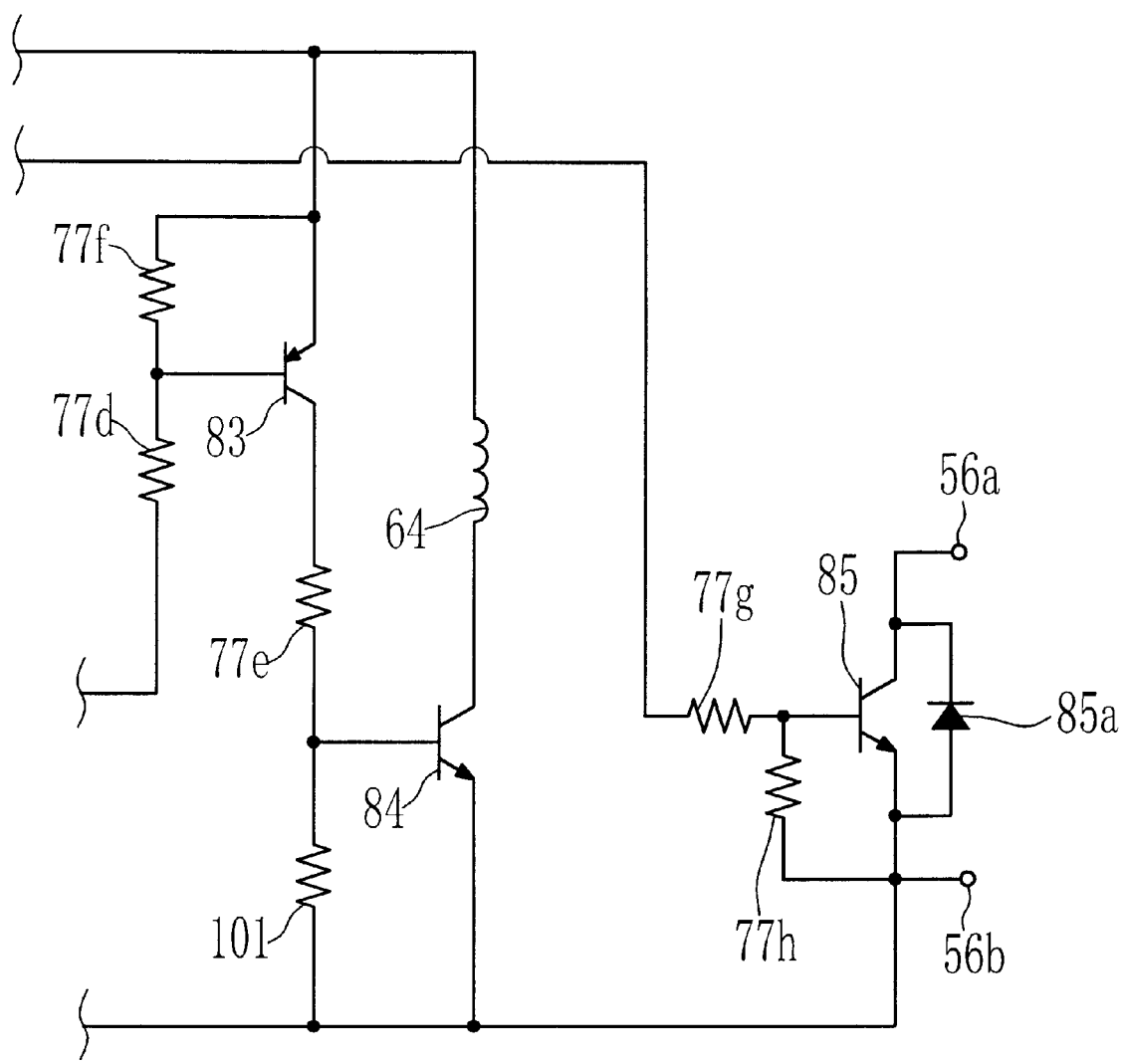
FIG. 12 shows a fragmentary circuit diagram of a fifth embodiment of the photometry device, wherein a resistor is connected between a base and an emitter of a switching transistor, for protecting the switching transistor from a counter electromotive force generated across a solenoid.

As a device for protecting the switching transistor 84 from being damaged by the counter electromotive force across the solenoid 64, connecting a capacitor 100 between the collector and emitter of the switching transistor 84, as shown in FIG. 11, or connecting a resistor 101 between the base and emitter of the switching transistor 84 is usable.

Although the stop blade 63 is automatically moved into or out of the optical path of the taking lens 12 depending upon the subject brightness in the above embodiment, it is alternatively possible to provide a device for indicating whether the subject brightness is above or below a reference level, e.g. by lighting a light emitting diode, so that the photographer may manually switch the position of a stop blade.

Although the above embodiments are designed to drive the solenoid 64 when the subject brightness is below the reference level, it is possible to design the photometry circuit to drive the solenoid when the subject brightness is above the reference level. In that case, the stop blade is moved into the optical path of the taking lens when the solenoid is driven. It is also possible to provide a stop blade with a large stop aperture and a small stop aperture, and insert either of the stop apertures in the optical path depending upon the subject brightness.

Although the present invention has been described with respect to the film unit, the present invention is not only applicable to the film units, but also to compact cameras or the like.

Thus, the present invention is not to be limited to the above embodiments but, on the contrary, various modifications will be possible to those skilled in the art without departing from the scope of claims appended hereto.

What is claimed is:

1. A photometry device provided in a camera, for detecting whether a subject brightness is less than or not less than a reference level, comprising:

a photoconductive element located to receive light from a subject, a first end of said photoconductive element being connected to a first electrode of a power source;

a resistor whose first end is set at the same potential as the first end of said photoconductive element;

a first transistor connected at its base to a second end of said photoconductive element, at its collector to a second end of said resistor and at its emitter to a second electrode of the power source;

a second transistor connected at its base to the second end of said resistor, at its collector to the second end of said photoconductive element, and at its emitter to the second electrode of said power source; and a switching transistor which is turned on in response to a predetermined one of said first and second transistors being turned on, wherein said first and second transistors are turned on and off in contradiction to each other depending upon whether a current flowing through said photoconductive element is less than or not less than a current flowing through said resistor, so the switching condition of said switching transistor is used for detecting whether the subject brightness is less than or not less than the reference level.

2. A photometry device as recited in claim 1, wherein when the subject brightness is less than the reference level, the current flowing through said photoconductive element becomes less than the current flowing through said resistor, so said second transistor is turned on, and said switching transistor is turned on responsive to said second transistor being turned on.

3. A photometry device as recited in claim 1, wherein said first and second transistors are the same type having the same properties, and a resistance between the base of said second transistor and said first end of said resistor is set equal to a resistance that is generated between said first end of said photoconductive element and the base of said first transistor when the subject brightness is equal to the reference level.

4. A photometry device as recited in claim 1, further comprising a photometry switch which is turned on to supply current from the power source to said photoconductive element and said resistor, wherein said first and second transistors keep their switching conditions till the power supply to said photoconductive element and said resistor is terminated.

5. A photometry device as recited in claim 4, further comprising a capacitor connected in parallel to the power source and charged by the current from the power source while said photometry switch is on, wherein after said photometry switch is turned off, said photoconductive element and said resistor are supplied with current discharged from said capacitor.

6. A photometry device as recited in claim 5, wherein said photometry switch is turned on in response to a shutter release operation on the camera.

7. A photometry device as recited in claim 6, wherein said first and second transistors keep their switching conditions for a time enough for the camera to complete an exposure in response to the shutter release operation.

8. A photometry device as recited in claim 4, wherein the power source is used for supplying a flash circuit of the camera, and said photometry device further comprises a device for stopping said flash circuit from charging in response to said photometry switch being turned on.

9. A photometry device as recited in claim 1, wherein said switching transistor is connected to a stop changing device for changing stop size of the camera.

10. A photometry device as recited in claim 9, wherein said stop changing device comprises a solenoid that is turned on or off by said switching transistor, and a stop blade movable into or out of an optical path of a taking lens to change over the stop size between two values, in cooperation with said solenoid.

* * * * *